(12) United States Patent
Singh et al.

(10) Patent No.: US 8,767,521 B2
(45) Date of Patent: Jul. 1, 2014

(54) METHOD AND APPARATUS FOR CROSSTALK CANCELLATION DURING SELT TESTING

(75) Inventors: Shailendra K. Singh, Fremont, CA (US); Amitkumar Mahadevan, Freehold, NJ (US); Laurent F. Alloin, Monmouth Beach, NJ (US)

(73) Assignee: Ikanos Communications Inc., Fremont, CA (US)

( * ) Notice: Subject to any disclaimer, the term of this patent is extended or adjusted under 35 U.S.C. 154(b) by 625 days.

(21) Appl. No.: 12/807,524

(22) Filed: Sep. 8, 2010

(65) Prior Publication Data

US 2011/0058468 A1 Mar. 10, 2011

Related U.S. Application Data

(60) Provisional application No. 61/240,621, filed on Sep. 8, 2009, provisional application No. 61/264,827, filed on Nov. 29, 2009.

(51) Int. Cl.
*H04J 1/12* (2006.01)

(52) U.S. Cl.
USPC ........................................ 370/201

(58) Field of Classification Search
USPC .......... 370/201; 379/1.03; 375/222, 346, 249, 375/350
See application file for complete search history.

(56) References Cited

U.S. PATENT DOCUMENTS

| | | | |
|---|---|---|---|
| 4,788,710 A * | 11/1988 | Lynch | 379/27.08 |
| 6,160,790 A | 12/2000 | Bremer | |
| 6,965,657 B1 * | 11/2005 | Rezvani et al. | 375/346 |
| 7,142,501 B1 * | 11/2006 | Barrass et al. | 370/201 |
| 7,289,554 B2 | 10/2007 | Alloin | |
| 7,356,049 B1 | 4/2008 | Rezvani | |
| 8,270,311 B2 * | 9/2012 | Lindqvist et al. | 370/252 |
| 2006/0251160 A1 * | 11/2006 | Fazlollahi et al. | 375/222 |
| 2008/0089485 A1 * | 4/2008 | Duvaut et al. | 379/1.03 |
| 2009/0175156 A1 | 7/2009 | Xu | |
| 2010/0135374 A1 * | 6/2010 | Kozek et al. | 375/227 |

FOREIGN PATENT DOCUMENTS

WO  WO2008030145  3/2008

OTHER PUBLICATIONS

Patrick Duvaut, Amitkumar Mahadevan, Massimo Sorbara, Ehud Langberg, Pravesh Biyani, Conexant Systems Inc., Red Bank, NJ USA, "Adaptive Off-Diagonal MIMO Pre-coder (ODMP) for Downstream DSL Self FEXT Cancellation", Globecom 2007, Nov. 26-30, 2007, Washington DC, USA, Also. ITU-T Contribution NC-028.

(Continued)

*Primary Examiner* — Raj Jain
(74) *Attorney, Agent, or Firm* — Pillsbury Winthrop Shaw Pittman LLP

(57) ABSTRACT

A system for performing a single ended line test (SELT) of a selected subscriber line within a bundle of in-service subscriber lines each supporting frequency division multiplexed multi-tone modulated XDSL communications. The system comprises: a crosstalk cancellation module and a SELT module. The crosstalk cancellation module is coupled to the subscriber lines and configured to cancel crosstalk between the selected subscriber line under test and the in-service subscriber lines. The SELT module couples to the crosstalk cancellation module and is configured to coordinate SELT testing with the crosstalk cancellation module to cancel crosstalk between the selected subscriber line and the in-service subscriber lines during testing.

18 Claims, 7 Drawing Sheets

(56) References Cited

OTHER PUBLICATIONS

Patrick Duvaut, Pravesh Biyani, Amitkumar Mahadevan, Shailendra Singh, Satyavardhan Maheshwari, "Adaptive Off-Diagonal MIMO Canceller (ODMC) for VDSL Upstream Self FEXT mitigation", EUSIPCO-2008, Switzerland.

Conexant Systems, "G.vector: Response to Contribution C-538 regarding description of algorithm based on use of error samples with an off-diagonal MIMO pre-coder (ODMP)—Part II: Joining Event", ITU—Telecommunication Standardization Sector, Temporary Document RJ-026 (Oct. 2007).

Conexant Systems, "Updated proposal for construction of a MIMO channel model for Evaluation of FEXT cancellation systems", NIPP-NAI-2007-009, San-Francisco, CA, Dec. 5-7, 2006.

Pravesh Biyani, Amitkumar Mahadevan, Patrick Duvaut, Shailendra Singh, "Caoperative MIMO for Alien Noise Cancellation in upstream VDSL", ICASSP-2009, Taipei, Taiwan.

International Telecommunication Standardization Sector of ITU, G.993.2, Amendment 3, (Aug. 2008) Very High Speed Digital Subscriber Line Transceivers 2 (VDSL2); "Proposed text for Accuracy of quiet line noise PSD per sub-carrier group (QLN ps)".

ITU-T contribution, 08CC-035, "G.lt : Proposed agreements for SELT Quiet Line Noise", Ericsson AB, Campbell, CA, Sep. 15-19, 2008 (1 of 2).

ITU-T contribution, 08CC-035, "G.lt : Proposed agreements for SELT Quiet Line Noise", Ericsson AB, Campbell, CA, Sep. 15-19, 2008 (2 of 2).

ITU-T contribution 08CC-041,"G.lt : Interference Measurement and Logging", BT, Campbell, CA, Sep. 15-19, 2008.

George Ginnis, John M. Cioffi; Vectored Transmission for Digital Subscriber Line Systems; IEE Journal on Selected Areas in Communications, vol. 20, No. 5, Jun. 2002.

* cited by examiner

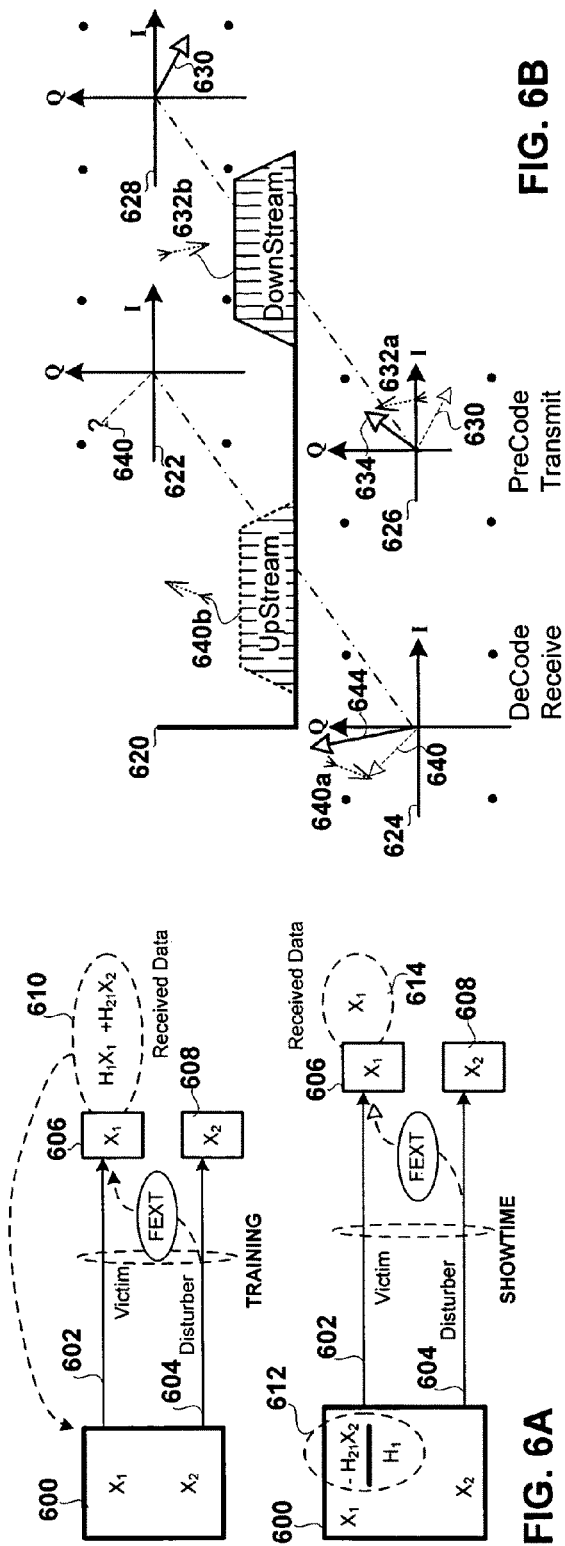
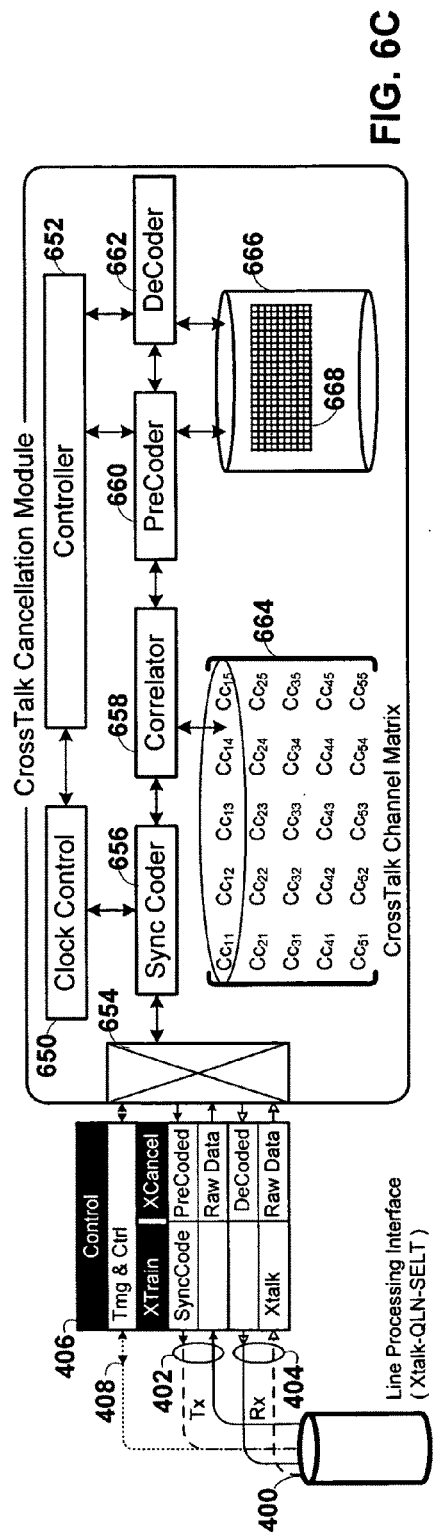
FIG. 6A
FIG. 6B
FIG. 6C

METHOD AND APPARATUS FOR CROSSTALK CANCELLATION DURING SELT TESTING

CROSS REFERENCE TO RELATED APPLICATION

This application claims the benefit of prior filed Provisional Applications No. 61/240,621 filed on Sep. 8, 2009 entitled "SELT for Vectored DSLs" and Provisional Application No. 61/264,827 filed on Nov. 29, 2009 entitled "SELT QLN for Vectored DSL" both of which are incorporated herein by reference in its entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL, SDSL, MDSL, RADSL, etc. all of which are broadly identified as XDSL have been developed to increase the effective bandwidth of existing subscriber line connections, without requiring the installation of new fiber optic cable. Subscriber lines were originally constructed to handle voice traffic in the narrow band between 300 Hz to 3000 Hz at bandwidths equivalent to several kilo baud. With XDSL significant increases in bandwidth have been made possible by utilizing frequencies higher than the voice band to deliver services such as: data, video, audio etc. Thus an XDSL modem may operate simultaneously with a voice band modem or a telephone conversation.

Within each standard a modulation protocol, e.g. discrete multi-tone (DMT), is specified for establishing a communication channel. DMT modulation involves establishing a communication channel with a plurality of sub-channels each with a center frequency a.k.a. carrier tone. The sub-channels are frequency division multiplexed across the available bandwidth. Each sub-channel may use quadrature phase amplitude modulation (QPAM) to modulate information. The center frequency, a.k.a. tone of each sub-channel serves as the carrier on which QPAM modulation of information is effected. The information modulated on a tone is identified in the frequency domain as a sub-symbol which defines a unique phase and amplitude relationship between the carrier tone and the information modulated on it. Each sub-symbol may be expressed as a complex number. Specific bits of information are converted to a corresponding complex number using a mapping table, which defines for all possible phase and amplitudes supported by the DMT protocol corresponding binary bits. Collectively all the sub-symbols modulated on each tone across a tone set are defined as a symbol, with the symbol rate defined by the corresponding X-DSL standard.

The primary factor limiting the bandwidth or channel capacity of any of the above discussed X-DSL protocols is noise, whether that noise be from echo, channel cross talk, impulse or background sources. Efforts are made throughout the DSL architecture to minimize noise.

The topology of subscriber lines themselves may be used to minimize cross-talk between subscriber lines. Typically, telephone subscriber loops are organized in a binder with 10, 25, or 50 pairs each sharing a common physical or electrical shield in a cable. Due to capacitance and inductive coupling there's cross-talk between each twisted pair even though the pairs are well insulated for DC. The effective cross-talk is reduced, but not eliminated, by adapting different twist distances among different pairs in the binder group. Binder groups are also twisted such that no two groups are adjacent for long runs.

The hybrid circuit which couples the modem to the subscriber line is also designed with noise reduction in mind. The hybrid is basically a bridge circuit which allows bi-directional communication on the subscriber line. When the bridge is balanced the spillover of noise from the modem's transmitted signal to the received signal is reduced. Balancing however requires an impedance match with the telephone subscriber loop which is never fully satisfied because the input impedance of the telephone loop varies from one loop to the next due to differences in length, topology, e.g. bridge-taps, and also temperature variations in the individual subscriber lines.

Typically within each binder of subscriber lines most lines will be in-service' i.e. carrying data for existing users. The remaining lines terminating at a home or business are therefore available to new or existing customers. When a customer orders a new line the Telco provider may engage in a process identified as pre-qualifying or characterizing a line, in order to correctly identify for the new user what level of throughput can be provided on the available subscriber line. Line length and available spectrum may dictate one or another level of service. If, for example high throughput service is requested by the new user, then VDSL provisioning may be called for. The ability of the Telco to provision this line with VDSL will be constrained by line characteristics. The length and quality of the subscriber line will determine whether all or a portion of the two or more upstream and two or more downstream communications VDSL bands will be available. The sheer length of the line results in significant attenuation of the upper communication bands rendering their use impractical. Even on shorter loops the presence of various topological features on the subscriber line such as: bridge-taps, jumpers and changes in wire gauge can also constrain bandwidth. In each instance it is critical in setting up a new customer that the line is properly characterized, to ensure customer satisfaction.

Typically, a process identified as Single Ended Line Testing (SELT) is used by the Telco to characterize the prospective available subscriber line before the customer has even purchased a modem. SELT has proven to be an effective method for characterizing a line whether or not it is terminated at the remote end. SELT subjects the line to passive and active analysis. Passive analysis involves performing a Quiet Line Noise (QLN) measurement on the line under test. QLN measurement takes place without any transmission onto the line under test, e.g. no probe signal. The subscriber line under test is categorized across the entire broadband spectrum for noise level and periodicity of impacting signals. Active analysis involves probing the line with a broadband probing signal and analyzing the resultant reflections, a.k.a. echoes, to further characterize the line. The resultant reflections are received and analyzed to determine line topology including length, bridge-taps, jumpers and changes in wire gauge and their resultant effect on available bandwidth and anticipated throughput level.

What is needed is a SELT process with improved capabilities for subscriber line characterization.

SUMMARY OF THE INVENTION

The present invention provides a method and apparatus for Single Ended Line Testing (SELT) of a subscriber line which is part of a binder. Improved isolation of the subscriber line under test from other 'in-service' subscriber lines allows either or both; reductions in interference from the SELT probe signal on the line under test into other lines in the binder, or conversely improvements in the accuracy of SELT measurements by removal of interference from 'in-service' subscriber lines into the line under test.

In an embodiment of the invention a system for performing a single ended line test (SELT) of a selected subscriber line within a bundle of in-service subscriber lines each supporting frequency division multiplexed multi-tone modulated XDSL communications is disclosed. The system comprises: a crosstalk cancellation module and a SELT module. The crosstalk cancellation module is coupled to the subscriber lines and configured to cancel crosstalk between the selected subscriber line under test and the in-service subscriber lines. The SELT module couples to the crosstalk cancellation module and is configured to perform SELT testing with the crosstalk cancellation module to cancel crosstalk between the selected subscriber line and the in-service subscriber lines during testing; thereby isolating the selected subscriber line under test from the in-service subscriber line.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which:

FIG. 6A is a hardware block diagram showing training and showtime phases of crosstalk cancellation of a subscriber line.

FIG. 6B is a detailed signal processing diagram showing crosstalk cancellation methodologies for upstream and downstream frequency division multiplexed subscriber line communications.

FIG. 6C is a detailed hardware block diagram of the crosstalk cancellation module of FIG. 1.

DETAILED DESCRIPTION OF THE EMBODIMENTS

A method and apparatus is disclosed which isolates 'in-service' XDSL subscriber lines from a line under test during Single Ended Line Testing (SELT). The invention may be implemented in hardware, firmware or software. The in-service subscriber lines may provisioned with frequency division multiple access (FDMA) communication channels with differing degrees of robustness for discrete multi-tone (DMT) modulation protocols including: asymmetric digital subscriber line (ADSL); very high bit rate digital subscriber line (VDSL) and other orthogonal frequency division multiplexing (OFDM) band plans including but not limited to the following:

TABLE 1

| Standard name | Common name | Downstream rate | Upstream rate |
| --- | --- | --- | --- |
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2+M | 24 Mbit/s | 3.5 Mbit/s |
| ITU G.993.1 | VDSL | | |
| ITU G.993.2 | VDSL 2 | | |

Figure 1B:
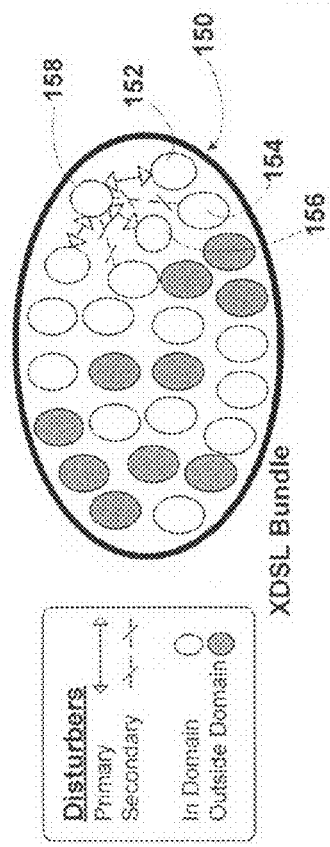
FIG. 1B is a cross sectional view of a bundle of subscriber lines.
Figure 1A:
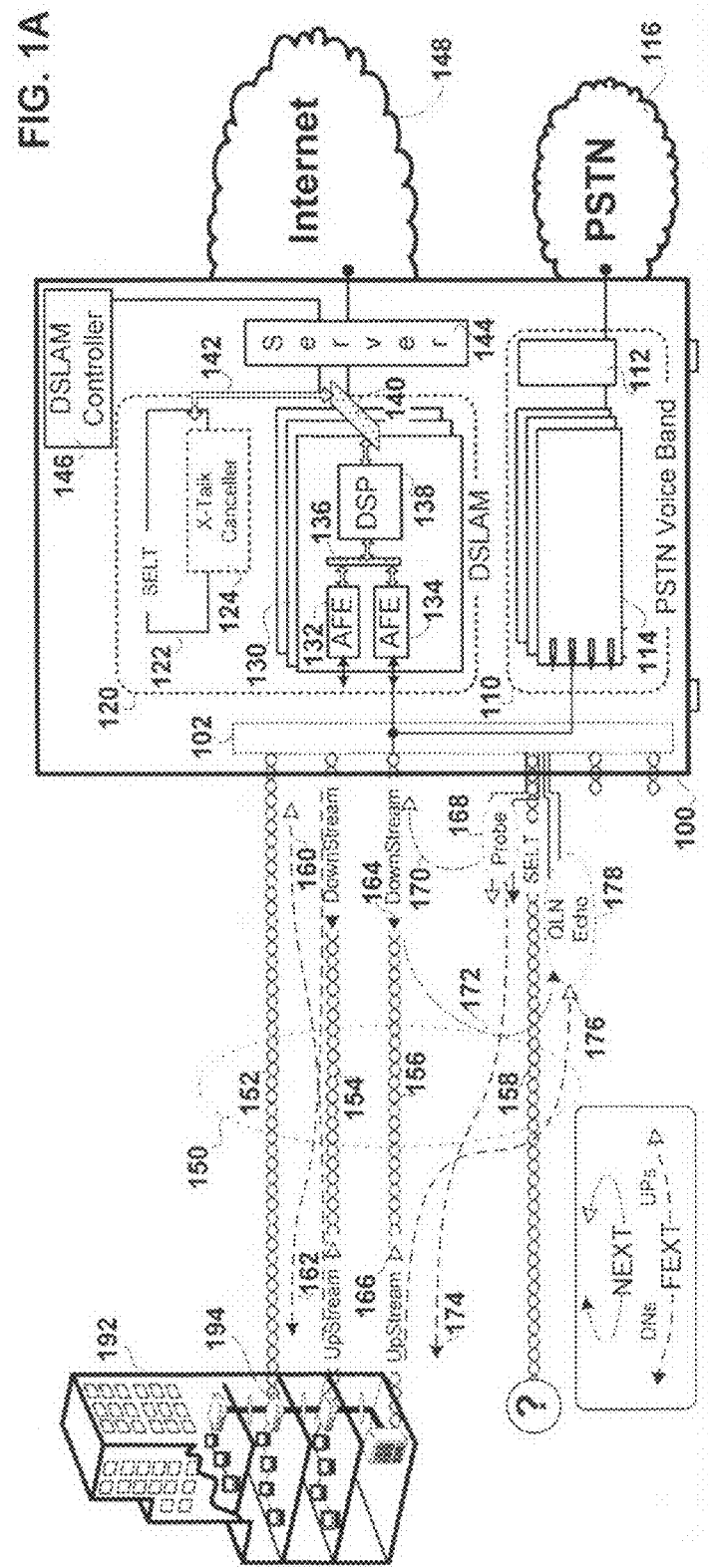
FIG. 1A shows an embodiment of a communication system with a logical modem at a central office (CO) coupled over subscriber lines to physical modems at a customer's premises.

FIG. 1A shows an embodiment of a communication system with a logical modem at a central office (CO) 100 coupled over subscriber lines, e.g. lines 152-158, to associated customer's premises equipment (CPE) e.g. physical modems at remote office building 192. Subscriber lines 152-156 are identified as 'in-service' in that they are coupled at the office building to modems, e.g. line 152 couples with modem 194, and carry subscriber data. The remaining 'available' line 158 is part of the bundle but is not carrying any subscriber data and further may not be connected to any modem at the remote office building. All subscriber lines handled by the CO originate in the splitter 102 of the CO. From this room connections are made for each subscriber line via splitters and hybrids to both a digital subscriber line access module (DSLAM) 120 and to the voice band racks 110. The splitter 102 shunts voice band communications to dedicated line cards, e.g. line card 114, or to a voice band modem pool (not shown). The splitter shunts higher frequency XDSL communications on the subscriber line to a selected line card, e.g. line card 130, within DSLAM 120. Voice band call set up is controlled by a Telco switch matrix 112 such as SS7. This makes point-to-point connections to other subscribers for voice band communications across the public switched telephone network (PSTN) 116.

The DSLAM module 120 includes a plurality of logical XDSL modems on multi-port line cards, e.g. line card 130, for handling XDSL communications. The DSLAM module also includes in an embodiment of the invention a Single Ended Line Test (SELT) module and a crosstalk cancellation module 124 which are coupled to one or more of the multi-port line cards via buses 142 and 140. In alternate embodiments of the invention either or both the SELT and crosstalk cancellation modules may be embodied in architectures in which a portion of the functionality required by each is embedded within the logical modem or sub-components thereof.

The SELT module is used to test a selected available subscriber line for length, topology, noise levels and other conditions for repair or provisioning analysis. The crosstalk cancellation module, either integral with or separate from the SELT module, is used to isolate a subscriber line under test from remaining in-service subscriber lines. In an embodiment of the invention the crosstalk cancellation module may also be used to actively cancel crosstalk between in-service subscriber lines in a process known as vectored DSL as specified in ITU-T Recommendation G.993.5 (g.vector), January 2010 entitled "*Self-FEXT Cancellation (Vectoring) for use with VDSL2 transceivers*".

The line card 130 implements a plurality of logical modems each coupled via a corresponding port to an associated subscriber line. One line card may drive multiple subscriber lines with individual subscriber communications channels. Each line card includes a digital signal processor (DSP) coupled to a plurality of analog front ends (AFE). The DSP 138 couples across a packet bus 136 with a number of AFEs of which AFEs 132-134 are referenced. Each AFE couples via a hybrid front end (HFE) (not shown) with a corresponding one of the subscriber lines. For downstream communications from the CO to the remote site, the DSP modulates the data for each communication channel. The AFE transforms the digital symbol packets assembled by the DSP and converts them to an analog signal which is output on the subscriber line associated with the respective channel. For upstream communications from the remote site to the CO, the AFE converts the communications to digitized data samples which are sent to the DSP where they are demodulated. The DSP may be capable of supporting more than one XDSL protocol for the subscriber lines to which the AFE's are coupled. Communication between AFE(s) and DSP(s) may be packet based. The line card 130 is coupled via the backplane bus 140 to a network, e.g. the Internet 148, via server 144. Each of the DSLAM line cards operates under the control of a DSLAM controller 146 which handles global provisioning, e.g. allocation of subscriber lines to AFE and DSP resources. The various components on the line card form a plurality of logical modems each handling frequency division multiple access (FDMA) upstream (from remote to CO) and downstream (from CO to remote) communications across corresponding subscriber lines. When an X-DSL communication is established on a subscriber line, a specific channel identifier is allocated to that communication. That identifier may be used in the above mentioned packet based embodiment to track each packet as it moves in an upstream or downstream direction between the AFE and DSP.

The subscriber lines in bundle 150 experience cross-talk between one another which degrades either or both communication reliability or throughput. Cross-talk results from inductive and capacitive coupling between lines that are not physically coupled to one another. Cross-talk is divided into what is known as near end cross talk (NEXT) and far end cross-talk (FEXT) depending on where the cross-talk is generated. NEXT is defined as cross-talk between subscriber lines in a binder coupled on one end with a common transceiver. FEXT is defined as a cross-talk between a receiving path and a transmitting path of the DSL transceivers on opposite ends of two different subscriber loops within the same bundle. The FEXT noise at the receiver front end of a particular DSL transceiver is caused by signals transmitted by other transceivers at the opposite end of the bundle. In the bundle 150 shown in FIG. 1A the primary crosstalk type among the in-service subscriber lines is FEXT. FEXT 160 and 162 from upstream and downstream communications respectively on line 154 is shown impacting communications on all subscriber lines including line 152. NEXT is reduced to negligible levels for all 'in domain' subscriber lines in the bundle. 'In domain' lines are lines driven time synchronously by a single line card or by a closely synchronized group of line cards. This synchronization coupled with the discrete frequency bands allocated for upstream and downstream communications ensures that even if present, the NEXT is not a concern in any of the frequency division multiplexing band plans associated with XDSL communications.

Testing of available subscriber lines for repair or provisioning level quantification is performed against a backdrop of crosstalk types which negatively impact testing. Testing is performed without requirement for any modem or technician on the far end of the line under test. This form of testing is therefore identified as Single Ended Line Testing (SELT). SELT typically involves passive and active analysis of the line. Passive analysis, a.k.a. Quiet Line Noise (QLN) involves receiving and analyzing received noise on the line. Active testing typically involves a probe signal and a resultant reflection thereof, a.k.a. echo, which is analyzed to determine line topology. Both forms of testing are negatively impacted by crosstalk.

QLN and Echo analysis 178 on the line under test is negatively impacted by FEXT 176 from the upstream channel 166 on in-service subscriber line 156 as well as by NEXT 172 from the downstream channel 164 on that same line. Additionally, during active analysis the probe 168 generates NEXT 170 and FEXT 174 crosstalk which negatively impacts the in-service lines as well. Alternate embodiments of the current invention provide varying levels of crosstalk isolation between the line under test and the in-service subscriber lines which improves the quality of SELT analysis and avoids disruption and retraining of in-service subscriber lines.

FIG. 1B is a cross sectional view of the bundle 150 of subscriber lines including lines 152-158. The bundle may comprise multiple binders, e.g. 4×25 binders, of subscriber lines. Some of those lines in the bundle may be coupled to time synchronous transceiver(s) and hence be identified as 'in domain lines'. These lines are particularly amenable to crosstalk cancellation. A single subscriber line may be categorized in terms of crosstalk as either or both a victim or a disturber. A line is said to be a victim as to incoming crosstalk from another line, identified as a disturber. Additionally subscriber lines, the crosstalk from which disturbs another line, may be categorized on the basis of the level of crosstalk into primary or secondary disturbers of the victim line.

Figure 2A:
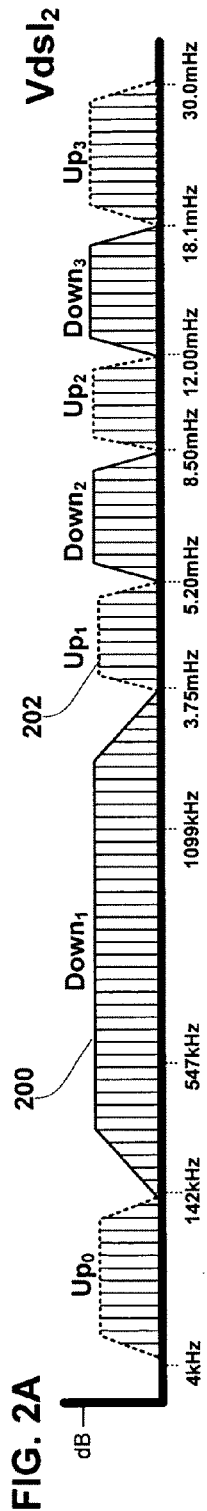
FIG. 2A is a graph of power versus frequency for a VDSL communication spectrum showing multiple upstream and downstream band plans.

FIG. 2A is a graph of power versus frequency for a VDSL communication spectrum showing multiple discrete upstream and downstream bands for bidirectional communication between opposing modems, e.g. bands 202 and 200 respectively. All communications are modulated on subchannels, a.k.a. tones, each separated evenly in frequency from one another, e.g. at 4.3125 kHz intervals.

Figure 2B:
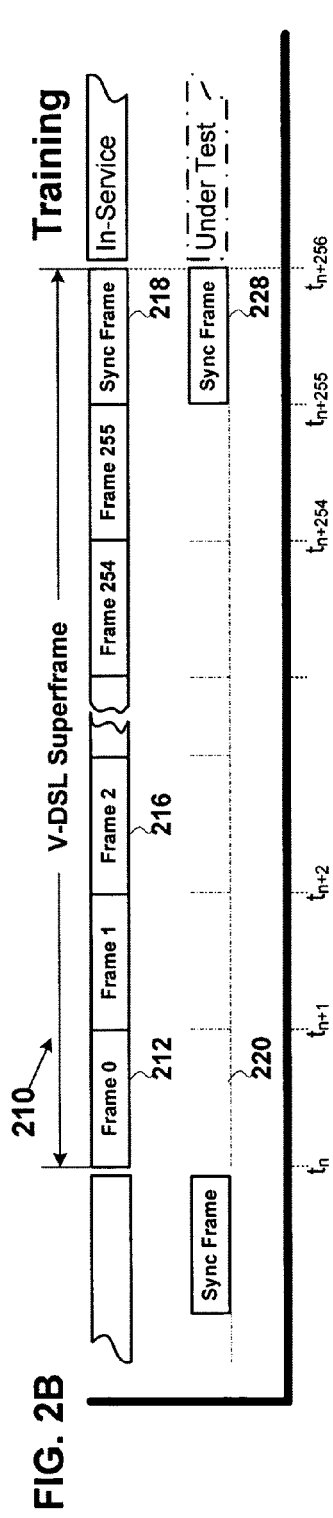
FIG. 2B-2C are graphs showing representative XDSL frames and super frames for in-service and under test lines during training and active SELT analysis respectively, in accordance with an embodiment of the invention.
Figure 2C:
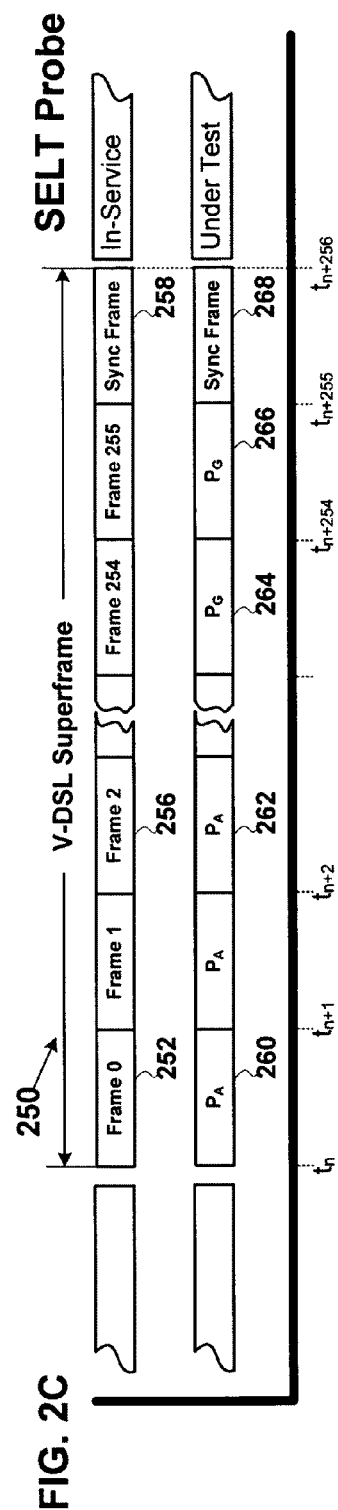

FIG. 2B-2C are graphs showing representative XDSL frames and super frames for in-service and under test lines during training and active SELT analysis respectively, in accordance with an embodiment of the invention. Each figure shows an in-service subscriber line with XDSL frames and super frames of a representative XDSL protocol, i.e. VDSL2, as specified by the International Telecommunication Union in ITU G.003.2 (02/2006) "*Series G: Transmission Systems and*

Media, Digital Systems and Networks; Digital Sections and Digital Line System-Access networks; Very high Speed Digital Subscriber Line Transceivers 2 (VDSL2)". Each frame comprises a symbol and each symbol comprises all the tones or sub-channels identified in the corresponding XDSL standard. On a single in-service subscriber line upstream and downstream frame boundaries and or superframes are aligned. Such alignment allows discrete modulation and demodulation of upstream and downstream communications on a subscriber line without analog filtering. Such synchronized communication channels are said to be 'orthogonal' to one another. At a higher level, upstream and downstream communication channels among a group of in domain in-service subscriber lines may also be synchronized, where for example they are all driven by a single line card of synchronized group of line cards. This higher level of synchronization, i.e. among subscriber lines, substantially attenuates out-of-band NEXT leakage between lines and also allows remaining in-band NEXT to be mitigated by crosstalk cancellation methodologies.

FIG. 2B shows the training phase of operation between an in-service subscriber line and a selected line under test in accordance with an embodiment of the invention. A representative superframe 210 on the in-service subscriber line is shown. The superframe includes two-hundred and fifty-six frames, e.g. frames 212 and 216, each of which carries user data modulated thereon. An additional frame identified as a synch frame 218 provides for continuous tracking of the crosstalk coupling coefficients between all in-service lines as well as the line under test. The line-under test is also modulated with synch symbols at intervals aligned with the synch frames of the in service subscriber lines. During this phase of operations there is no data on the remaining frames, e.g. frame 220, of the line under test. This basic structure imposed on the test line allows crosstalk coupling coefficients between the in-service lines and the line under test. The crosstalk coupling coefficients that are determined may be either or both, the crosstalk coupling for the in-service line(s) as disturber of the line under test or vice-versa. Where successive synch symbols are injected with orthogonal code sequences, multiple disturber-victim coefficients may be determined at once. Where crosstalk coupling coefficients from the in-service lines as disturbers into the line under test is to be determined, the in-service lines, and specifically the synch symbols thereof are driven with orthogonal code sequences, and the received synch symbols on the victim line under test are analyzed to determine the coupling coefficients for each disturber. Conversely, where crosstalk coupling coefficients from the line under test, e.g. the active probing thereof, are to be determined, the synch frames on the line under test are driven with a known code or code sequence, and the received synch symbols on each victim line under test are analyzed to determine crosstalk coupling coefficients for the probe signal on the line under test into the in-service subscriber lines.

FIG. 2C shows the active SELT probe phase of operation between an in-service subscriber line and a selected line under test in accordance with an embodiment of the invention. The representative superframe 250 on the in-service subscriber line is shown. The superframe includes frames 252 and 256, each of which carries user data modulated thereon and the following synch frame 258 which provides for continuous tracking of the crosstalk coupling coefficients between all in-service lines as well as the line under test. The line-under test is also modulated with synch symbols at intervals aligned with the synch frames of the in service subscriber lines. Additionally, during this active SELT probe phase of operations some or all of the remaining frames, e.g. frames 260, 262, 264, 266 are driven with a probe signal or symbol each of which is also aligned with corresponding frame boundaries on the line under test. This basic structure imposed on the test line allows either or both cancellation of crosstalk during probe intervals on the line under test into corresponding frames on the in service subscriber lines or vice versa. Both transmission and reception of probe and resultant echo are synchronized with existing frames on the in service lines.

In an embodiment of the invention probe symbols are repeated over several successive frames and altered for each successive block of frames. Probe injection in the form of a sequence of periodic or pseudo-periodic symbols (identical in nature to the format of the DMT symbols transmitted of the line-in service, with the addition of the cyclic prefix and suffix . . . ) offers the property that the convolution of the channel and transmitted signal appears to be a circular convolution of the channel input sequence and the channel response, making it possible to take full advantage of the principle of orthogonality between subcarriers, and the application of a per-tone one-tap precoder or canceller for the purpose of mitigating the impact of the in-line services into the SELT and vice-versa. The repetitive contiguous probe signal as shown in FIG. 2C can be applied with particular advantage to a family of active line reflectometry tests identified as Frequency Domain Reflectometry (FDR).

Figure 3:
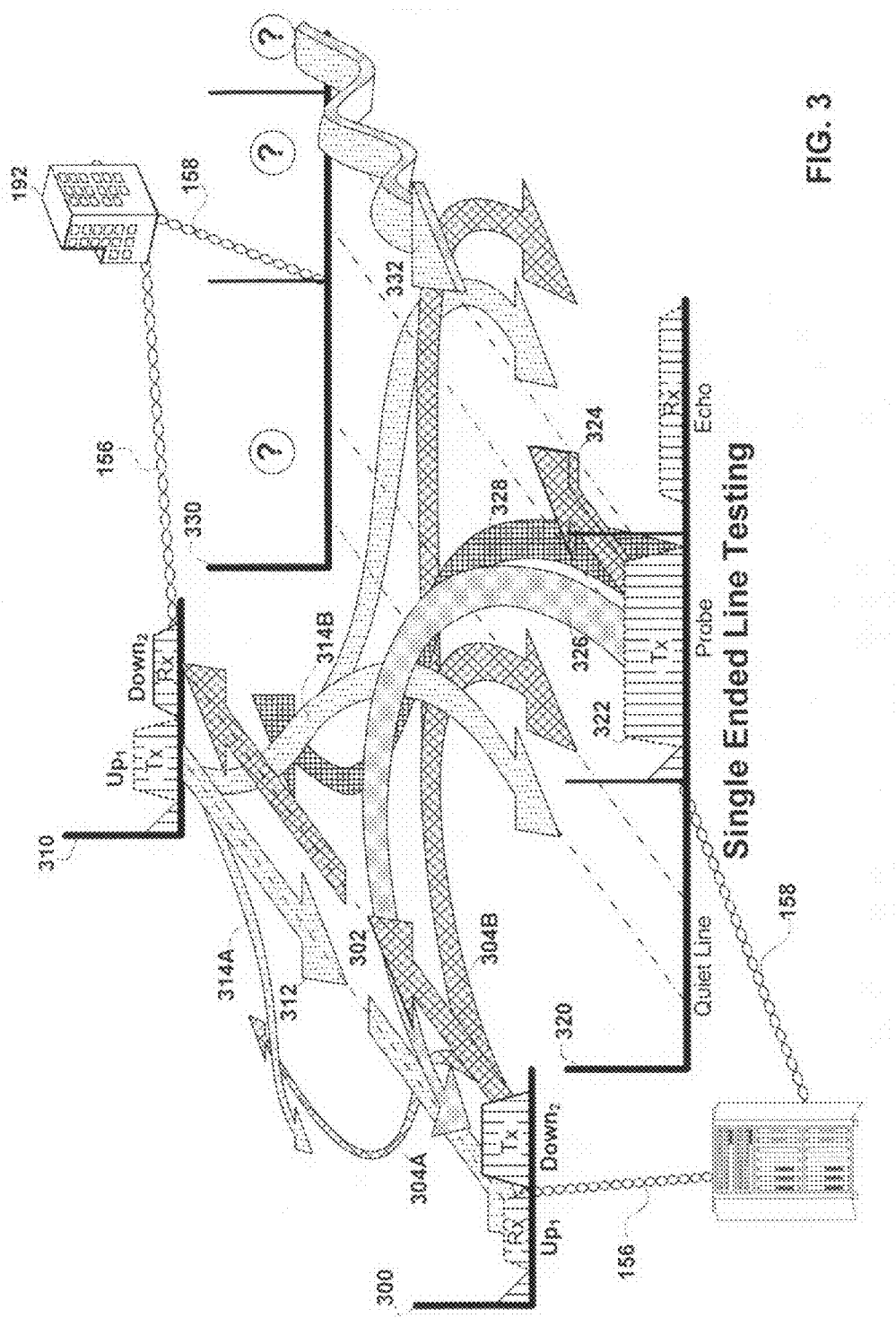
FIG. 3 is a signal diagram showing crosstalk between an 'in-service' subscriber line and a line under test.

FIG. 3 is a signal diagram showing crosstalk between an 'in-service' subscriber line 156 and a line under test . The downstream and upstream communication channels 302, 312 on the in-service subscriber line 156 are shown on graphs 300, 310 which show relative amplitude versus frequency for the channels. The quiet line noise (QLN), probe 324 and echo 332 are shown for the line under test 158 on graphs 320 and 330 which show relative amplitude versus frequency therefore. In the embodiment of the invention shown, the probe transmission 324 and resultant reflection/echo 332 spans the entire spectrum 322 otherwise allocated discretely to upstream and downstream communications on the neighboring in-service subscriber lines. In an alternate embodiment of the invention the probe could span only a portion of the available spectrum, e.g. that associated with all or a portion of the downstream communication channel on the in-service subscriber lines.

The in-service subscriber lines generate FEXT 314a and 304a on the upstream and downstream communication channels respectively of each victim in-service line which negatively impacts communications thereon. The line under test is also a victim to crosstalk disturbances from each in-service subscriber line, e.g. line 156. These disturbances reduce the accuracy of both QLN and echo analysis.

The line under test is victim during echo reception to NEXT disturbance 304b from the downstream communications on the in-service lines. NEXT disturbance 304b victimizes the line under test and is spectrally confined to downstream frequency bands or ranges as specified by the XDSL standard. Additionally SELT probing may be broadband, i.e. may not be limited to the downstream bands utilized by the in-service subscriber lines. Under these conditions the line under test is also victim during echo reception to FEXT disturbances from in-service subscriber lines. FEXT 314a, 314b from the upstream communication channel on the in-service line victimizes all adjacent lines including the line under test and is spectrally confined to the upstream frequency bands as specified by the XDSL standard for upstream communications.

SELT probing may also disturb other adjacent in-service subscriber lines as victims. That portion of the SELT probe that fall into the frequency ranges/bands allocated to downstream communications on the in-service lines acts as a FEXT disturber 328 of adjacent in-service subscriber lines. Additionally where portions of the SELT probe fall into the upstream frequency ranges/bands on the in-service lines those in-service lines are subject to NEXT 326 from the SELT probe as disturber. Various embodiments of the current invention provide crosstalk isolation between the line under test either as victim to or disturber of the in-service subscriber lines.

Figure 4:
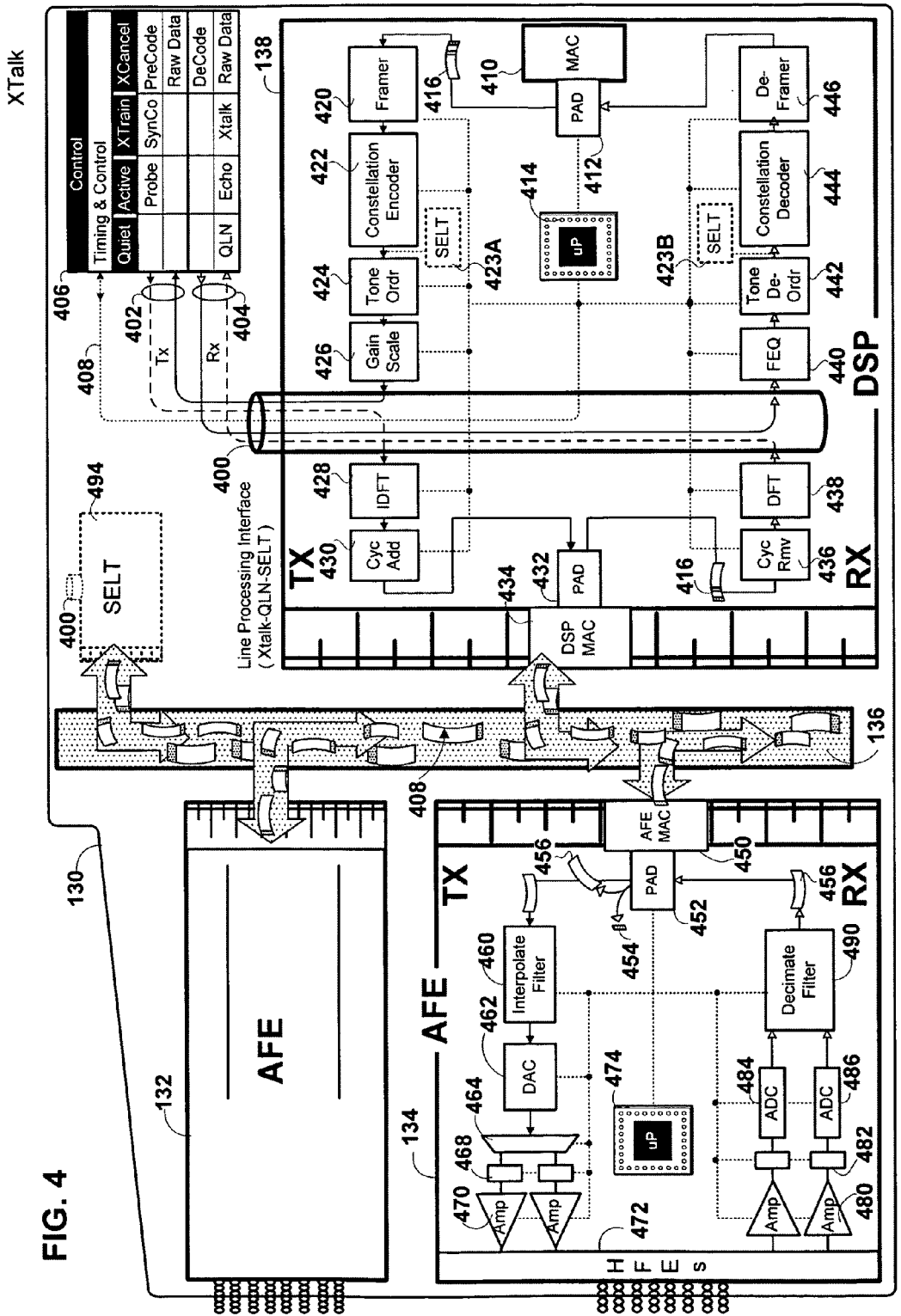
FIG. 4 is a hardware block diagram of an embodiment of a logical modem on a line card as shown in FIG. 1.

FIG. 4 is a hardware block diagram of an embodiment of a multi-port logical modem, a.k.a. transceiver, on a line card 130 as shown in FIG. 1 in which multiple analog front end (AFE) chips 132-134 connect with one or more digital signal processing (DSP) chips, e.g. DSP, 138 across packet bus 136. In an alternate embodiment of the invention each AFE has separate ports for each subscriber line connection which are coupled directly to an associated port of the corresponding DSP, thereby obviating the need for a bus. These digital and analog chips are all mounted on the line card 130 shown in FIG. 1. A single line card may currently support 64 to 128 ports each handling communications of an associated one of the digital subscriber lines. In the embodiment of the invention, packets of raw data are shown being transported between the DSP and AFEs as well as within each DSP and AFE. Packet processing between the DSP and AFE chips involves transfer of bus packets 408. Packet processing within a DSP may involve device packets 416. Packet processing within an AFE may involve raw data packets 456.

In this embodiment of the invention the line card has a line processing interface 400 with SELT and crosstalk cancellation modules 122 and 124 shown in FIG. 1. The interface may intercept either or both the analog or digital portions of the transmit and receive path. The line processing interface may intercept either or both the time domain portion or the frequency domain portion of the transmit and receive path. In the embodiment shown the line processing interface interfaces with the frequency domain portion of the transmit and receive paths. The SELT module may coordinate SELT testing with the crosstalk cancellation module.

The line processing interface allows the SELT module and the crosstalk cancellation module to perform with one another as well as with the line card and each of the subscriber lines provisioned thereby. Table 406 indicates various data sources and sinks for determination of crosstalk cancellation coefficients, for quiet and active SELT analysis, and for crosstalk cancellation. The line processing interface includes a control bus 408, a transmit bus 402 and a receive bus 404. This integration in an embodiment of the invention, allows selection of the line under test and synchronization of frame boundaries on the line under test with the in service subscriber lines on line card 130 under control of the SELT module 122 through control bus 408. (See FIGS. 2B-2C) To determine crosstalk coupling coefficients the synch symbols of disturber line(s) may be injected with code or orthogonal code sequences by the SELT module over the transmit bus and the resultant victim crosstalk on the receive bus analyzed by the crosstalk module. In an embodiment of the invention precoding of the victim line(s) by the crosstalk cancellation module over the transmit bus may be used to immunize the victim line from crosstalk. In an embodiment of the invention decoding of the victim line(s) by the crosstalk cancellation module over the receive bus may be used to immunize the victim line from crosstalk, by cancelling crosstalk therefrom.

In an alternate embodiment of the invention SELT and crosstalk cancellation modules may be integrated with the line card 130. In alternate embodiments of the invention the AFE and DSP may be displaced from one another on separate line cards linked by a DSP bus. There may be multiple DSP chipsets on a line card. In an embodiment of the invention the DSP and AFE chipsets may support multiple XDSL protocols.

The DSP chip 138 includes an upstream (receive) and a downstream (transmit) processing path with both discrete and shared modulation and demodulation modules or components. The components are configurable on the fly to process each packet of data in a manner consistent with the characteristics of the corresponding subscriber line over which the packet will be transported, the assigned modulation protocol for that line and the service level assigned to the subscriber. The modules or components may be implemented in hardware, firmware or software without departing from the scope of the claimed invention. In an embodiment of the invention selected ones of the modules are responsive to packet header information and/or control information to vary their processing of each packet to correspond with the X-DSL protocol and line code and channel which corresponds with the packet contents. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 434 which handles packet transfers to and from the DSP bus. The MAC couples with a packet assembler/disassembler (PAD) 432. For upstream packets, the PAD handles removal of the DSP bus packet 408 header and the packaging of the data into a device packet 416 which may include a device header and a control header. The content of these headers is generated by the core processor 414 using information downloaded from the DSLAM controller 146 (See FIG. 1) as well as statistics such as gain tables gathered by the de-framer 446, or embedded operations channel communications from the subscriber side. The PAD 432 embeds the required commands generated by the core processor in the header or control portions of the device packet header of the upstream data packets. The upstream packets may collectively include data from multiple channels each implementing various ones of the X-DSL protocols. Thus the header of each device packet identifies the channel corresponding with the data contained therein. Additionally, a control portion of the packet may, in an embodiment of the invention, include specific control instructions for any of the discrete or shared components which make up the upstream or downstream processing paths.

Upstream processing in the DSP begins with the removal of the cyclic prefix/suffix in module 436. Next in the discrete Fourier transform module (DFT) 438 received data from each subscriber line is transformed from the time to the frequency domain. In this embodiment of the invention, the information in the header of the packet is used to maintain channel identity of the data as it is demodulated. The DFT is responsive to the header information in each packet to setup the transform with the appropriate parameters for that channel, e.g. sample size, and to provide channel specific instructions for the demodulation of the data. The demodulated data may be passed via the line processing interface for either or both SELT analysis or crosstalk cancellation after which it is passed as a packet to the next component in the upstream path, i.e. the frequency error corrector (FEQ) 440. Next the tones are reordered in the tone deordered 442 and then subject to constellation decoding from sub-symbols to bits in the constellation decoder 444. Then the received communications are deframed in the deframer and Reed Solomon decoder 446. This component reads each device packet header and processes the data in it in accordance with the instructions or parameters in its header. The demodulated, decoded and de-framed data is passed to PAD 412. In PAD 412 the device packet header is removed and the demodulated data contained therein is wrapped with an asynchronous transfer mode (ATM) or other network header and passed to the medium access control (MAC) 410 for transmission over the ATM or other network to which the line card is coupled (See FIG. 1).

On the downstream path, downstream packets containing digital data destined for various subscribers is received by the MAC 410 and passed to the PAD 412 where the ATM or other header is removed and the downstream device packet 416 is assembled. Using header content generated by the core processor 414 the PAD assembles data from the ATM or other network into channel specific packets each with their own header, data and control portions. The downstream packets are then passed to the Framer and Reed Solomon encoder 420 where they are processed in a manner consistent with the control and header information contained therein. From the framer packets are subject to constellation encoding in the constellation encoder 422, to tone ordering in the tone orderer 424 and to gain scaling in the gain scaler 426. The data may be passed via the line processing interface for either or both SELT analysis or crosstalk cancellation after which it is passed as a packet to the next component in the upstream path, i.e. the inverse discrete Fourier transform component/module 428 (IDFT) for transformation from the frequency to the time domain. The setup of the IDFT is re-configured on the fly to match the requirements assigned to each packets corresponding channel or subscriber line. The addition of any cyclic extensions is performed in cyclic extension adder 430. Next, each downstream packet with the modulated data contained therein is then passed to the PAD 432. In the PAD 432 the device packet header and control portions are removed, and a DSP bus header is added to the data. This header identifies the specific channel and may additionally identify the sending DSP, the target AFE, the packet length and such other information as may be needed to control the receipt and processing of the packet by the appropriate AFE. The packet is then passed to the MAC 434 for placement on the DSP bus 136 for transmission to the appropriate AFE.

FIG. 4 also shows a more detailed view of the processing of upstream and downstream packets within the AFE 134. In the embodiment of the invention shown, device packets are not utilized in the AFE. Instead, channel and protocol specific processing of each packet is implemented using control information for each channel stored in memory at session setup. Each AFE chip includes an upstream (receive) and a downstream (transmit) processing path with both discrete and shared modulation and demodulation modules or components. The components are configurable on the fly to process each packet of data in a manner consistent with the characteristics of the corresponding subscriber line over which the packet will be transported, the assigned modulation protocol for that line and the service level assigned to the subscriber.

Downstream packets from the DSP are pulled off the bus 136 by the corresponding AFE MAC, e.g. MAC 450, on the basis of information contained in the header portion of that packet. Each downstream packet is passed to PAD 452 which removes the header 454 and sends it to the core processor 474. The core processor matches the information in the header with channel control parameters. These control parameters may have been downloaded to the AFE at session setup. The raw data 456 portion of the downstream packet is passed to interpolator and filter 460. The interpolator up-samples the data and low pass filters it to reduce the noise introduced by the DSP. Implementing interpolation in the AFE as opposed to the DSP has the advantage of lowering the bandwidth requirements of the DSP bus 136. From the interpolator data is passed to a digital-to-analog converter (DAC) 462 which processes each channel in accordance with commands received from the core processor 474 using the control parameters downloaded during channel setup. The analog output of the DAC is passed via analog mux 464 to a corresponding one of sample and hold devices and analog filters 468. Each sample and hold and filter is associated with a corresponding subscriber line. The sampled data may be amplified by line amplifiers 470 onto the corresponding port and associated subscriber line via a hybrid front end (HFE) 472. The parameters for each of these devices, i.e. filter coefficients, amplifier gain etc. are controlled by the core processor using the above discussed control parameters. For example, where successive downstream packets carry downstream channels each of which implements different protocols, e.g. G.Lite, ADSL, and VDSL the sample rate of the analog mux 464 the filter parameters for the corresponding filter and the gain of the corresponding one of analog amplifiers 470 will vary for each packet. This "on the fly" configurability allows a single downstream pipeline to be used for multiple concurrent protocols.

On the upstream path many of the same considerations apply. Individual subscriber lines couple to individual line amplifiers 480 through splitter and hybrid 472. Each channel is passed through analog filters and sample and hold modules 482 and dedicated analog-to-digital conversion (ADC) modules 484-486. As discussed above in connection with the downstream/transmit path, each of these components is configured on the fly for each new packet depending on the protocol associated with it. From each ADC fixed amounts of data for each channel, varying depending on the bandwidth of the channel, are processed by the decimator and filter module 490. The amount of data processed for each channel is determined in accordance with the control parameters for the session downloaded from the DSLAM controller 146 (See FIG. 1) during the setup phase for each channel.

From the decimator and filter the raw upstream data 456 is passed to PAD 452 during each bus interval. The PAD wraps the raw data in a DSP header with channel ID and other information which allows the receiving DSP(s) to properly process it. The upstream packet is placed on the bus by the MAC 450. A number of protocols may be implemented on the bus 136. In an embodiment of the invention the DSP operates as a bus master governing the pace of upstream and downstream packet transfer and the AFE utilization of the bus.

Figure 5A:
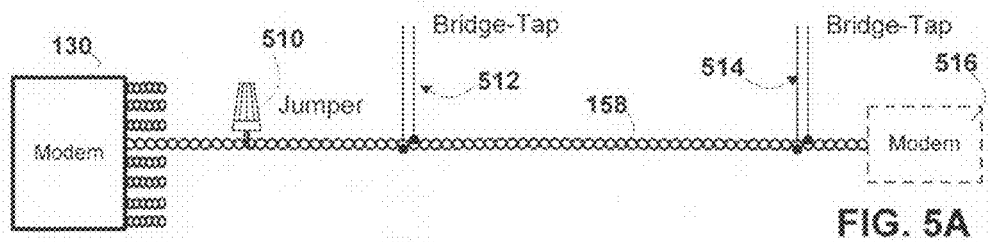
FIG. 5A is an elevation view of a representative subscriber line.

FIG. 5A is an elevation view of a representative subscriber line, e.g. subscriber line 158 coupled at one end to a logical modem 130 for SELT analysis and with either an open connection at the opposing end or a connection to an opposing modem 516. In either case the testing performed on the line is characterized as 'single ended' due to the lack of involvement of any device that may be connected to the opposing end during SELT testing. SELT testing is therefore exclusively performed by the logical modem 130, the SELT testing module 122 and the crosstalk cancellation module 124. (See FIG. 1) Representative objects or features of the subscriber line 158 under test include: line length, changes in wire gauge, jumper 510 and bridge-taps 512-514.

Figure 5B:
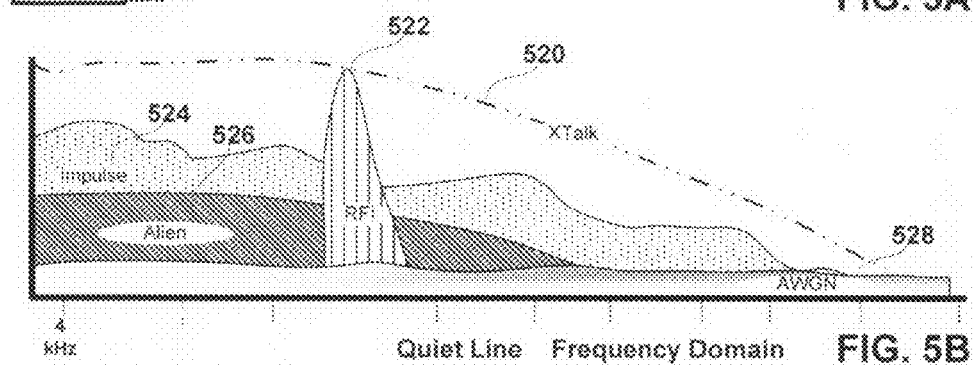
FIG. 5B is a graph of noise level versus frequency for a representative single ended line test of the subscriber line shown in FIG. 5A.

FIG. 5B is a graph of noise level versus frequency for a representative single ended line test of the subscriber line shown in FIG. 5A. The SELT test which generates this graph is referred to as a quiet line noise (QLN) test or a passive test since it does not involve active probing of the line, rather only listening to and characterizing the noise on the line. In an embodiment of the invention QLN for analysis can be obtained by averaging over an appropriate number of received symbols, aligned with the frames of the in-service lines, the noise on the line under test. As shown on the graph there are many possible noise sources on the line including: crosstalk 520, radio frequency interference (RFI) 522, impulse noise 524, alien noise 526 and additive white Gaussian noise (AWGN) 528. Crosstalk 520 from other in-service lines may be one of the more dominant noise types. For those in-service lines that are in the same domain as the selected line under test, the current invention allows isolation of the selected line under test from the in domain in-service lines by crosstalk cancellation of either: the disturbance from the subscriber line under test into the in-service lines or vice versa. In the latter case, isolation of the line under test from crosstalk disturbances from the in-service lines allows improved characterization and analysis of remaining noise sources after incoming crosstalk is cancelled. A typical RFI source is a radio station the transmissions of which degrade prospective DSL transport capabilities in narrowly defined portion(s) of the XDSL spectrum. A typical source of impulse noise is an appliance, motor or light which is switched on. Alien noise sources include crosstalk from in-service subscriber lines that do not terminate at the same line card or central office.

Figure 5C:
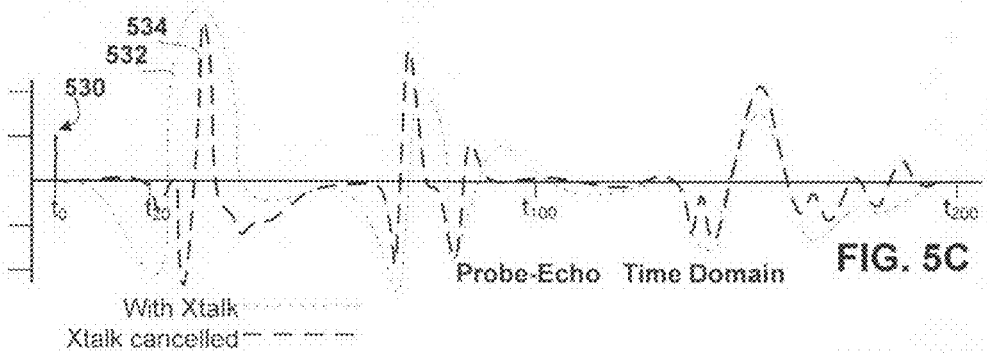
FIG. 5C is a graph of signal amplitude versus time for a representative single ended line test probe and echo of the subscriber line shown in FIG. 5A.

FIG. 5C is a graph of signal amplitude versus time for a representative active SELT probe and echo of the subscriber line shown in FIG. 5A. For those in-service lines that are in the same domain as the selected line under test, the current invention allows isolation of the selected line under test from the in domain in-service lines by crosstalk cancellation of either or both: the disturbance from the subscriber line under test into the in-service lines or vice versa. In the latter case, isolation of the line under test from crosstalk disturbances from the in-service lines allows improved characterization and analysis of remaining noise sources after incoming crosstalk is cancelled. Representative time domain echo profiles with 532 and without 534 cancellation of crosstalk from in domain in-service subscriber lines are shown. SELT analysis may take place in either or both the time or the frequency domain.

Figure 5D:
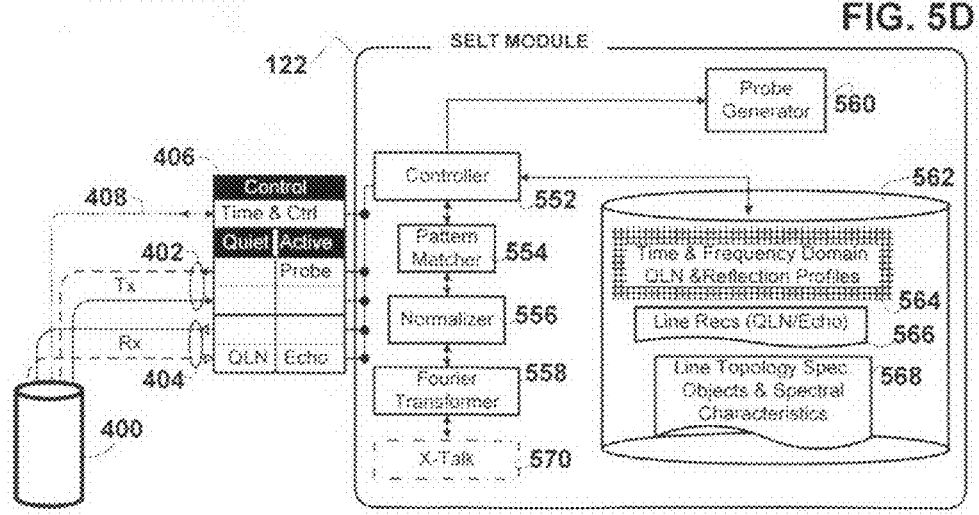
FIG. 5D is a detailed hardware block diagram of the SELT module of FIG. 1.

FIG. 5D is a detailed hardware block diagram of the SELT module 122 of FIG. 1. The SELT module includes: a controller 552, a pattern matcher 554, a normalizer 556, a Fourier transformer 558, a probe generator 560 and storage 562. Storage 562 includes, in an embodiment of the invention, pattern lookup tables 564 with representative time and/or frequency domain reflection profiles for active SELT analysis or various quiet line disturber profiles for passive (QLN) SELT analysis. Storage also includes test records 566 from passive or active testing of the line and result records 568 characterizing the line in terms of parameters such as: line length, noise sources, line topology and spectral characteristics of the line.

Passive SELT, a.k.a. QLN analysis, may in an embodiment of the invention include a preliminary phase in which crosstalk from the in service lines into the line under test is cancelled. Crosstalk cancellation is accomplished by synchronizing symbol/frame boundaries between the line under test and the in domain in-service lines. Next the crosstalk canceller module injects orthogonal code sequences into the sync symbols of the disturber lines, i.e. the in domain in-service subscriber lines. The crosstalk canceller module analyzes the received noise on the victim line under test during corresponding sync symbol intervals thereon to determine crosstalk correlation coefficients from each of the disturber in domain in-service subscriber lines. In the final operation, the crosstalk canceller averages the noise received over subsequent received symbol intervals aligned with the in-service subscriber lines and cancels the crosstalk thereon using the actual and estimated data on the in domain in-service lines and the corresponding crosstalk correlation coefficients. The resultant crosstalk cancelled noise is then passed to the SELT module for QLN analysis in the next phase.

QLN processing, in an embodiment of the invention, is initiated in the SELT module's controller 552 in which preprocessing of the received noise with or without crosstalk cancellation is used to enhance the received noise and the resultant noise record 566 is stored in storage 562. The pattern matcher 554 then compares the noise record with representative QLN signal profiles 564. After each match the normalizer 556 processes the noise record to remove the matched profile from the noise record, after which the remaining noise record is subject to successive further rounds of profile matching and normalization. After each iteration the QLN result records 568 are updated. In an embodiment of the invention the crosstalk cancelled signal is subject to QLN analysis as discussed above in either or both the time domain and the frequency domain with the corresponding transformation performed by the Fourier transform module 558. Upon completion of the QLN analysis a determination as to the repair or provisioning requirements of the line under test may be made or may be deferred pending the results of the active SELT analysis of the line.

Active SELT, a.k.a. probe and echo/reflection analysis, may in an embodiment of the invention include a preliminary phase in which crosstalk is cancelled. Crosstalk cancellation may be limited to either or both; a) removing crosstalk from each disturber probe symbol on the line under test into the victim in domain in-service subscriber lines, or b) removing crosstalk from the disturber in domain in-service subscriber lines into the echo or reflection of the line under test. In either case the symbol/frame boundaries of the line under test and the in domain in-service subscriber lines are aligned. Next the crosstalk canceller module injects orthogonal code sequences into the synch symbols of the disturber line(s). If crosstalk from the line under test as disturber is to be cancelled then the synch symbols on the line under test are injected with code. If the crosstalk from the in domain in-service lines as disturbers is to be cancelled then the synch symbols on the in-service lines are injected with orthogonal code sequences. The corresponding received communications on the victim line(s) are then correlated by the crosstalk canceller with the injected code to determine crosstalk coupling coefficients. Once the crosstalk coupling coefficients have been determined the active probing of the line under test commences. The probe symbol/signal generated by the probe generator 560 is similarly aligned with frame boundaries on the in domain in-service subscriber lines whether or not crosstalk is to be cancelled. If crosstalk from the line under test as disturber is to be cancelled then the crosstalk on those victim in-service lines during the intervals corresponding to the probe symbol is cancelled using either or both decoding of upstream communications or precoding of downstream of all in domain in-service subscriber lines using. If crosstalk from the in domain in-service subscriber lines into the echo/reflection is to be cancelled then the crosstalk in the received echo/reflection is cancelled using the crosstalk coupling coefficients and the actual and/estimated user data on each in-service line during the symbol interval aligned with the echo. The crosstalk cancellation module passes the received echo/reflection with or without crosstalk cancellation to the SELT module for echo/reflection analysis in the second phase.

Active SELT processing, in an embodiment of the invention, is initiated in the SELT module's controller 552 in which pre-processing of the echo(s)/reflection(s), with or without crosstalk cancellation, is used to enhance the received echo record(s) 566. The pattern matcher 554 then compares the echo record with representative echo/reflection signal profiles 564, each corresponding with a topological feature of a line, e.g. bridge-tap, jumper . . . etc. After each match the normalizer 556 processes the echo record to remove the matched profile from the echo record, after which the remaining echo record is subject to successive further rounds of profile matching and normalization. In each iteration the echo result records 568 are updated with the last matched topological feature of the line under test. In an embodiment of the invention the echo records are subject to analysis as discussed above in either or both the time domain and the frequency domain with the corresponding transformation performed by the Fourier transform module 558. Upon completion of the probe echo/reflection analysis the topology of the line under test is contained in the echo result records 568. The line topology contained in these records may be used to make a determination as to the repair or provisioning requirements of the line under test.

In an embodiment of the invention the crosstalk cancellation may be integrated into the SELT module in the form of crosstalk canceller 570. In another embodiment of the invention the SELT line card 130 may include integral SELT components, such as probe generation component 423A and QLN or Echo reception component 423B (See FIG. 4). In still another embodiment of the invention the line card 130 includes a discrete DSP 494 coupled to bus 136 for SELT processing. (See FIG. 4).

FIGS. 6A, 6B, 6C show various aspects of crosstalk cancellation in accordance with an embodiment of the invention. Crosstalk canceling in XDSL is generally conceived of as a frequency domain process. It can be accomplished for bundled subscriber lines coupled on one end to a modem pool, and to discrete modems on the opposing end, a.k.a. vectoring, or on a bundle of subscriber lines coupled at both opposing ends to associated modem pools, a.k.a. multiple-input multiple output (MIMO). Synchronizing and aligning symbols on different lines allows crosstalk canceling to be performed using a single operation per tone (and per cross talker).

Crosstalk cancellation involves two phases of operation. In the first, crosstalk coupling coefficients between each disturber into a victim line are determined. This determination may be made on the basis of data gathered from sync symbols, or more generally on any symbol in which disturber data is known. All sync symbols in a vectored system are aligned and the sign is modulated with an orthogonal sequence. Each line is assigned an orthogonal sequence. The correlation of the data received on consecutive sync symbols of each victim line with each of the orthogonal sequences on each disturber line over the duration of the orthogonal sequence yields an estimate of the crosstalk coupling coefficient, a.k.a. crosstalk channel coupling coefficient. When this is done, crosstalk coupling and hence cancellation coefficients can be derived for each victim-disturber combination from the slicer errors of consecutive sync symbols. In an embodiment of the invention the determined crosstalk coupling coefficients are for the line under test as victim of the in domain in-service subscriber lines as disturbers. The only asymmetry in this operation is between the processing for the downstream and upstream channels with the former requiring the remote modem to pass back the received errors of the downstream band through the upstream communication channel to the other end. In another embodiment of the invention the determined crosstalk coupling coefficients are for the line under test as disturber of the victim in domain in-service subscriber lines. In still another embodiment crosstalk coupling coefficients are determined for both the line under test as victim together with the line under test as disturber. After the crosstalk coupling coefficients are determined the second phase begins.

In the second phase of operation the isolation of the test line from the in-service lines is accomplished by cancellation of a selected one or all of the actual crosstalk there between using the corresponding prior determined crosstalk coupling coefficients. In an embodiment of the invention the line under test as disturber is isolated from the victim in-service subscriber lines by cancellation of crosstalk generated by the probe signal. In another embodiment of the invention the line under test as victim is isolated from the disturber in-service subscriber lines by cancellation of the crosstalk generated by the in-service subscriber lines into the selected subscriber line under test as victim. In still another embodiment of the invention the line under test is isolated from the in domain in-service subscriber lines as to both crosstalk from the selected line under test as disturber of the in-service subscriber lines and vice versa.

The manner in which crosstalk is cancelled depends on whether it is performed on the transmitter or receiver. For cancellation of crosstalk at the transmitter, e.g. of the downstream communication channel, precoding is used. Each tone/sub-channel of user data in each symbol interval is combined with a crosstalk cancellation vector which is essentially the product of the inverse of the crosstalk coupling coefficient with the corresponding user data aggregated for all disturbers of the associated bin/tone/sub-channel in each symbol interval as seen by the remote receiver. This operation, known as precoding, processes user data before transmission and specifically shifts each raw sub-symbol or tone for the associated user data by an amount inversely proportional to the displacement that will be effected on that sub-channel by the aggregate disturber crosstalk experienced during transport across the subscriber line. As a result of the precoding, the received communication sub-symbol corresponds to the original user data before precoding and without impact of the crosstalk. For crosstalk cancellation of crosstalk disturbance at a receiver, e.g. of an upstream communication channel, a post reception crosstalk cancellation operation identified as decoding is performed. In an embodiment of the invention decoding relies on combining known crosstalk cancellation coefficients with user data received with varying degrees of immunity to crosstalk and post processing the data in one or more mathematically intensive operations such as: zero forcing-successive interference cancellation (ZF-SIC) to remove crosstalk. (See for example G. Ginis and J. M. Cioffi, "*Vectored transmission for digital subscriber line systems*," IEEE Journal on Selected Areas in Communications, vol. 20, no. 5, pp. 1085-1104, 2002).

FIG. 6A is a simplified transmission diagram showing training and showtime phases respectively of precoding operation for the downstream communication channel. In the training phase the transceiver 600 is shown transmitting data across two bundled subscriber lines 602-604 to remote transceivers 606-608 respectively. During the training phase of operation the crosstalk from the transmissions on each disturber into an associated victim line is determined, in terms of what is known as a crosstalk coupling coefficient. In the example shown, the transmission on disturber line 604 results in crosstalk on the victim line 602, which crosstalk impairs reception on the victim line. The crosstalk is characterized as far end cross talk (FEXT) since it is generated on the communications received by transceiver 606 from the transmissions at the opposite end of the bundle on neighboring disturber line 604. The resultant received signal 610 is passed back to the transceiver 600 during training to evaluate the crosstalk channel. The crosstalk is represented by a term $H_{21}*X_2$ in 610, where the term $H_{21}$ is the crosstalk channel from line 604 into line 602. $H_1$ is the "direct or victim channel", i.e. the coupling of the transmissions of transceiver 600 onto line 602 to the reception of the intended transceiver 606. The training allows the modems to estimate the value of $H_{21}$. The showtime phase of operation illustrates the concept of pre-coding, or pre-compensating the crosstalk which is appropriate for the downstream communication channel. In order to pre-compensate, a term $-H_{21}/H_1*X_2$, reference 612, is added to the transmission on line 602. After traversing the direct channel to the remote transceiver 606 on line 602, this term will have changed to become $-H_1*(H_{21}/H_1*X_2) = -H_{21}*X_2$. As such, it has the same value as the expected crosstalk from line 604, only with opposite sign. Therefore, the added term will cancel the physical crosstalk from line 604 into line 602 as exhibited in the resultant received signal 614, which exhibits cancellation of the crosstalk. In an alternate embodiment of the invention crosstalk coupling coefficient determination may be operative during either or both the training or showtime phases of each subscriber line's operation.

FIG. 6B is a detailed signal processing diagram showing crosstalk cancellation methodologies for upstream and downstream frequency division multiplexed subscriber line communications. A graph 620 of an upstream and downstream band plan for a single subscriber line is shown. Constellation maps 622 and 624 show the transmit encoding and the receive decoding of a single sub-channel in a single symbol interval of an upstream communication channel from the remote modem to the CO. Constellation maps 626 and 628 show the transmit encoding and the receive decoding of a single sub-channel in a single symbol interval of a downstream communication channel from the CO to the remote modem.

Vector 632b is the aggregate crosstalk from all disturbers onto the selected bin or sub-channel on the downstream transmission path in a selected symbol interval. That vector is the aggregate of the sum of the products of the actual data transmitted on corresponding tones of each disturber in the selected symbol interval with the associated crosstalk coupling coefficients between disturber and victim for the selected tone or sub-channel, as seen by the remote modem's receiver. Crosstalk cancellation vector 632a is the inverse of the aggregate crosstalk vector 632b. Precoding downstream communications involves taking the raw user data 630 for the selected sub-channel in each symbol interval and adding to it the crosstalk cancellation vector 632a. The resultant vector sum, i.e. precoded vector 634, corresponds to the actual transmission in the selected sub-channel in the symbol interval. The aggregate crosstalk into the downstream communication shifts the transmitted vector by an amount inversely proportional to the crosstalk cancellation vector, with the result that the received data on the sub-channel is crosstalk cancelled, i.e. corresponds with the raw user data 630.

Vector 640b is the estimated aggregate crosstalk from all disturbers onto the selected bin or sub-channel on the upstream transmission path in a selected symbol interval. That vector is the aggregate of the sum of the products of the estimated actual data transmitted on corresponding tones of each disturber in the selected symbol interval with the associated crosstalk coupling coefficients between disturber and victim for the selected tone or sub-channel. The estimated crosstalk cancellation vector 640a is the inverse of the estimated aggregate crosstalk vector 640b. Decoding upstream communications involves taking received vector 644 and removing crosstalk from it by adding to it the estimated crosstalk cancellation vector 640a to determine the resultant raw user data 640 for the selected sub-channel in each symbol interval.

FIG. 6C is a detailed hardware block diagram of the crosstalk cancellation module of FIG. 1. The crosstalk cancellation module interoperates with the logical modem(s) of both the in-service subscriber lines as well as of the line under test over interface 400 to cancel crosstalk between the line under test and the in domain in-service subscriber lines. The crosstalk cancellation module in an embodiment of the invention includes: a clock control 650, a controller 652, a crossbar switch 654, a synch coder 656, a correlator 658, a precoder 660, a decoder 662 and storage 666. All sub-modules operate under control of controller 652. The crossbar switch couples the crosstalk cancellation module with the logical modem(s) and the SELT module 122 via the line processing interface 400. The crossbar switch operating under direction of controller 652 couples the crosstalk cancellation module to the appropriate one of the subscriber lines, i.e. disturber or victim, during both the determination of crosstalk coupling coefficients as well as during crosstalk cancellation phases of operation. The clock control synchronizes the line under test with the in domain in-service subscriber lines so that frame boundaries are aligned during all phases of operation. The synch coder injects orthogonal code sequences into the synch symbols of all disturber subscriber line communications during determination of crosstalk coupling coefficients. The correlator correlates received communications with the crosstalk generated by the synch symbols to determine all desired disturber-victim crosstalk coupling coefficients. In an embodiment of the invention these coefficients are transformed into a crosstalk cancellation matrix 664. The precoder handles the precoding of transmissions on each victim line to isolate it from crosstalk. The decoder handles the decoding of received communications on each victim line to isolate it from crosstalk. All records 668 associated with crosstalk cancellation are placed in storage.

In an alternate embodiment of the invention selected crosstalk cancellation module components such as the synch coder may be implemented in the line card itself, without departing from the scope of the claimed invention.

Figure 7:
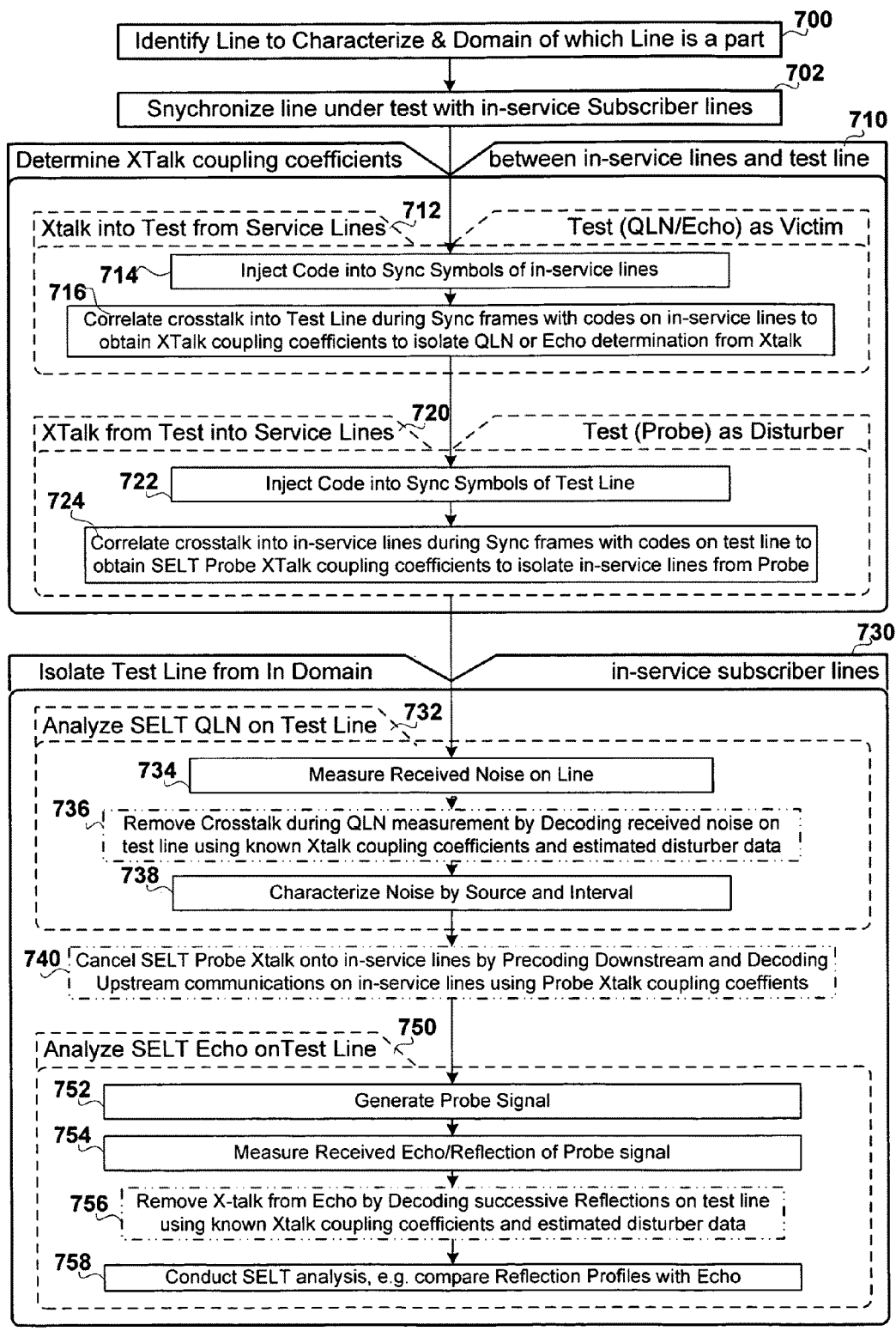
FIG. 7 is a process flow diagram of SELT crosstalk cancellation in accordance with various embodiments of the invention.

FIG. 7 is a process flow diagram of SELT crosstalk cancellation in accordance with various embodiments of the invention. FIG. 7 shows both general processes common to all embodiments of the invention and detailed sub-processes which in various combinations form different embodiments of the invention.

Generally there are four general processes associated with all embodiments of the invention. The first general process 700 involves identifying the line selected for SELT testing as part of a domain which also includes in-service subscriber lines. In the second general process 702 the line selected for SELT testing is synchronized with the in-service subscriber lines which are part of the same domain. Synchronizing aligns the frame boundaries of the in-service lines with received and transmitted signals on the line under test. In the third general process 710 the crosstalk coupling coefficients between in-service and test lines are determined. Finally, in the fourth process 730, one or more levels of isolation between the line under test and the in domain in-service subscriber lines is provided. The isolation allows either or both, improved SELT measurements due to removal of disturber crosstalk from in-service subscriber lines or reduced SELT disturbance into in-service subscriber lines.

Within each of the general processes 710 and 730 there are sub-processes all of which may be carried out in their entirety or individually in various combinations depending on the embodiment of the invention and without departing from the scope of the claimed invention.

In general process 710 crosstalk coupling coefficients may be determined for either or both the line under test as victim to crosstalk from in-service subscriber lines as disturbers in sub-process 712 or for the line under test as disturber of in-service subscriber lines as victims in sub-process 720. Sub-process 712 is appropriate where the crosstalk to be cancelled is the crosstalk coming into the line under test as victim during either SELT QLN or Probe-Echo measurements. Sub-process 720 is appropriate where the crosstalk to be cancelled is the crosstalk generated by the SELT probe as disturber into the in-service lines as victims.

In general process 730 crosstalk cancellation associated with isolating the in-service lines and the line under test may embody any one or all of three sub-processes 732, 740 and 750.

Sub-process 732 involves SELT analysis of QLN on the line under test and can be carried out with or without the benefit of crosstalk cancellation of the disturbances from the in-service lines into the received noise on the line under test. Cancellation of disturber crosstalk from the in-service subscriber lines into the SELT QLN measurements constitutes the first of three types of isolation between in-service and under test subscriber lines in accordance with an embodiment of the invention. Such cancellation requires as a pre-condition that the crosstalk cancellation coefficients from the in-service lines as disturbers have been determined in prior coupling coefficient determination sub-process 712.

Sub-process 740 involves cancellation of disturber crosstalk from the SELT probe onto the in-service subscriber lines and constitutes the second of three types of isolation between in-service and under test subscriber lines in accordance with another embodiment of the invention. Such cancellation requires as a pre-condition that the crosstalk cancellation coefficients from the line under test as disturber have been determined in prior coupling coefficient determination sub-process 720.

Sub-process 750 involves SELT analysis of echo or reflection on the line under test and can be carried out with or without the benefit of crosstalk cancellation of the disturbances from the in-service lines into the received echo of the SELT probe on the line under test. Cancellation of disturber crosstalk from the in-service subscriber lines into the SELT echo measurements constitutes the third of the three types of isolation between in-service and under test subscriber lines in accordance with still another embodiment of the invention. Such cancellation requires as a pre-condition that the crosstalk cancellation coefficients from the in-service lines as disturbers have been determined in prior coupling coefficient determination sub-process 712.

The sub-processes 712 and 720 which are part of the crosstalk coupling coefficient determination 710 each include one or more discrete steps. Sub-process 712 includes the step 714 of injecting orthogonal code sequences into the sync symbols of in-service subscriber lines. Next in step 716 crosstalk into the test line during synch symbol intervals or frames is correlated with known codes on the in service-lines injected in the prior step to determine crosstalk coupling coefficients from the in-service disturbers into the line under test. Sub-process 720 includes the step 722 of injecting orthogonal code sequences into the sync symbols of the line under test. Next in step 724 crosstalk into each victim in-service subscriber line from the line under test during synch symbol intervals or frames is correlated with known codes on the line under test injected in the prior step to determine crosstalk coupling coefficients from the line under test as disturber into the in-service lines.

The sub-processes 732, 740, and 750 which are part of the general process 730 of isolating in-service and under test subscriber lines each include one or more discrete steps.

Sub-process 732 includes the step 734 of measuring received noise on the line under test. Next in optional step 736 crosstalk in the received noise can be cancelled if the required disturber coefficients have been determined in prior sub-process 712, discussed above. In optional step 736 crosstalk received from in domain in-service subscriber lines during QLN measurement may be removed by decoding received noise on the test line using known crosstalk coupling coefficients and estimated disturber data. Next in step 738 the received noise, with or without the isolation provided by crosstalk cancellation, is used to characterize the line under test in terms of: noise source, level, and periodicity for example.

Sub-process 740 involves cancellation of disturber crosstalk from the SELT probe onto the in-service subscriber lines and involves precoding downstream communications and decoding upstream communications on each victim in domain in-service subscriber line using the probe crosstalk coupling coefficients determined in prior sub-process 720 and the estimated or actual SELT probe signal on each subject in domain in-service subscriber line.

Sub-process 750 includes the step 752 of generating a probe signal. In embodiments of the invention involving cancellation of crosstalk from in-service subscriber lines into the resultant echo/reflection the probe signal is repeated across successive contiguous frames the boundaries of which are aligned with the in-service subscriber line frame boundaries. Next in step 754 the resultant echo/reflection is received. Then in optional step 756 crosstalk in the received echo can be cancelled if the required disturber coefficients have been determined in prior sub-process 712, discussed above. In optional step 756 crosstalk received from in domain in-service subscriber lines during echo/reflection measurement may be removed by decoding received echo on the test line using known crosstalk coupling coefficients and actual or estimated disturber data of the in-service lines. In an embodiment of the invention where line length of the subscriber line under test is short enough that the return delay for the echo/reflection is less than the interval encompassed by the cyclic extensions of the probe frame, then precoding of the probe may be utilized to affect crosstalk cancellation in the resultant echo. Next in step 758 the received echo, with or without the isolation provided by crosstalk cancellation, is used to characterize the line under test in terms of: length and topology for example.

In alternate embodiments of the invention the isolation may be limited to portions or sub-portions of the XDSL band plan, e.g. upstream band(s) or downstream band(s) or sub-portions thereof without departing from the scope of the claimed invention.

The components and processes disclosed herein may be implemented as software, hardware, firmware, or a combination thereof, without departing from the scope of the Claimed invention.

In the embodiments of the invention discussed above a logical packet switched modem is shown handling all in domain subscriber lines. In alternate embodiments of the invention logical modems with serial rather than packet switched connections to each port may be implemented to handle all in domain subscriber lines without departing from the scope of the claimed invention. In still another embodiment of the invention physical modems may be implemented to handle all in domain subscriber lines without departing from the scope of the claimed invention.

In the embodiments of the invention discussed above the code sequences injected to the synch symbols have in several instances been described as orthogonal to one another. Orthogonal code sequences allow concurrent determination of crosstalk correlation coefficients between multiple disturber-victim pairs. In an alternate embodiment of the invention the requirement of orthogonality may be avoided where the determination of crosstalk correlation coefficients is determined serially for one disturber-victim pair at time.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for performing a single ended line test (SELT) of a selected subscriber line within a bundle of in-service subscriber lines each supporting frequency division multiplexed multi-tone modulated XDSL communications, thereon; and the system comprising:
    a crosstalk cancellation module coupled to the subscriber lines and configured to cancel crosstalk between the selected subscriber line under test and the in-service subscriber lines;
    a single ended line testing (SELT) module coupled to the crosstalk cancellation module and configured to perform SELT testing with the crosstalk cancellation module to cancel crosstalk between the selected subscriber line and the in-service subscriber lines during testing;
    thereby isolating the selected subscriber line under test from the in-service subscriber lines;
    a probe generator to generate a probe signal on the selected subscriber line; and
    a controller coupled to the crosstalk cancellation module and the probe generator to control timing alignment of the probe signal with existing frame boundaries on the in-service subscriber lines and to communicate information corresponding to the probe signal to the crosstalk canceller module, thereby enabling the crosstalk cancellation module to cancel at least Far End Crosstalk (FEXT) disturbance from the probe signal on the selected subscriber line under test into the victim in-service subscriber lines.

2. The system of claim 1, wherein the SELT module further comprises:
    a Fourier transformer for transforming received Quiet Line Noise (QLN) from a time domain to a frequency domain;
    wherein the controller is coupled to the crosstalk cancellation module and to the Fourier transformer to control timing alignment of the Fourier transformer with existing frame boundaries on the in-service subscriber lines and to communicate information corresponding to the received Quiet Line Noise (QLN) on the selected subscriber line under test to the crosstalk canceller module, thereby enabling the crosstalk cancellation module to cancel at least Far End Crosstalk (FEXT) disturbance from the in-service subscriber lines into the victim selected subscriber line under test.

3. The system of claim 1, wherein the SELT module further comprises:
    a second probe generator to generate a second probe signal and responsive echo therefrom on the selected subscriber line;
    wherein the controller is further coupled to the second probe generator and to the crosstalk cancellation module to control timing alignment of the received echo resulting from the probe signal with existing frame boundaries on the in-service subscriber lines, and to communicate to the crosstalk canceller module information corresponding to the echo, thereby enabling the crosstalk cancellation module to cancel at least Far End Crosstalk (FEXT) disturbance from the in-service subscriber lines into the echo on the victim selected subscriber line under test;
    thereby substantially improving echo measurements by the SELT module.

4. The system of claim 1, wherein the crosstalk cancellation module cancels both far end crosstalk (FEXT) and near end crosstalk (NEXT) from the disturber in-service subscriber lines into the victim selected subscriber line during SELT testing.

5. The system of claim 1, wherein the SELT module further comprises:
    a second probe generator responsive to a probe control signal to generate a broadband probe signal on the selected subscriber line, which signal spans both upstream together with downstream portions of the frequency division multiplexed communication bands on the in-service subscriber lines; and
    the crosstalk canceller module further configured to cancel both Far End Crosstalk (FEXT) together with Near End Crosstalk (NEXT) disturbance from probe signal on the line under test into the victim in-service subscriber line.

6. The system of claim 1, further comprising:
    the crosstalk cancellation module coupled to the subscriber lines and further configured to cancel crosstalk between the in-service subscriber lines.

7. A method for performing a single ended line test (SELT) of a selected subscriber line within a bundle of in-service subscriber lines each supporting frequency division multiplexed multi-tone modulated XDSL communications, thereon; and the method comprising:
    cancelling crosstalk between the selected subscriber line under test and the in-service subscriber lines;
    thereby isolating the selected subscriber line under test from the in-service subscriber lines during SELT testing,
    wherein the cancelling act comprises:
    transforming received Quiet Line Noise (QLN) from a time domain to a frequency domain at intervals aligned in time with existing XDSL frame boundaries on the in-service subscriber lines; and
    cancelling at least Far End Crosstalk (FEXT) disturbance from the in-service subscriber lines into the victim selected subscriber line under test;
    thereby substantially improving QLN measurements.

8. The method of claim 7, wherein the cancelling act further comprises:
    synchronizing SELT testing of the selected subscriber line with existing XDSL frame boundaries on the in-service subscriber lines.

9. The method of claim 7, wherein the cancelling act further comprises:
    generating on the selected subscriber line a probe signal aligned in time with existing XDSL frame boundaries on the in-service subscriber lines; and
    cancelling at least Far End Crosstalk (FEXT) disturbance from the probe signal on the selected subscriber line under test into the victim in-service subscriber lines.

10. The method of claim 7, wherein the cancelling act further comprises:
- generating on the selected subscriber line a probe signal and responsive echo thereof aligned in time with existing XDSL frame boundaries on the in-service subscriber lines; and
- cancelling at least Far End Crosstalk (FEXT) disturbance from the in-service subscriber lines into the echo on the subscriber line under test; thereby substantially improving echo measurements.

11. The method of claim 7, wherein the cancelling act further comprises:
- cancelling both far end crosstalk (FEXT) and near end crosstalk (NEXT) from the disturber in-service subscriber lines into the selected subscriber line during SELT testing.

12. The method of claim 7, wherein the cancelling act further comprises:
- generating on the selected subscriber line a broadband probe signal which signal spans both upstream together with downstream portions of the frequency division multiplexed communication bands on the in-service subscriber lines; and
- cancelling both Far End Crosstalk (FEXT) together with Near End Crosstalk (NEXT) disturbance from the broadband probe signal on the subscriber line under test into the victim in-service subscriber lines.

13. An apparatus, comprising:
- means for performing a single ended line test (SELT) of a selected subscriber line within a bundle of in-service subscriber lines each supporting frequency division multiplexed multi-tone modulated XDSL communications, thereon; and
- means for cancelling crosstalk between the selected subscriber line under test and the in-service subscriber lines;
- thereby isolating the selected subscriber line under test from the in-service subscriber lines during SELT testing, wherein the means for cancelling comprises:
- means for generating on the selected subscriber line a probe signal and responsive echo thereof aligned in time with existing XDSL frame boundaries on the in-service subscriber lines; and
- means for cancelling at least Far End Crosstalk (FEXT) disturbance from the in-service subscriber lines into the echo on the subscriber line under test;
- thereby substantially improving echo measurements.

14. The apparatus of claim 13, wherein the means for cancelling further comprises:
- means for synchronizing SELT testing of the selected subscriber line with existing XDSL frame boundaries on the in-service subscriber lines.

15. The apparatus of claim 13, wherein the means for cancelling further comprises:
- means for generating on the selected subscriber line a probe signal aligned in time with existing XDSL frame boundaries on the in-service subscriber lines; and
- means for cancelling at least Far End Crosstalk (FEXT) disturbance from the probe signal on the selected subscriber line under test into the victim in-service subscriber lines.

16. The apparatus of claim 13, wherein the means for cancelling further comprises:
- means for transforming received Quiet Line Noise (QLN) from a time domain to a frequency domain at intervals aligned in time with existing XDSL frame boundaries on the in-service subscriber lines; and
- means for cancelling at least Far End Crosstalk (FEXT) disturbance from the in-service subscriber lines into the victim selected subscriber line under test;
- thereby substantially improving QLN measurements.

17. The apparatus of claim 13, wherein the means for cancelling further comprises:
- means for cancelling both far end crosstalk (FEXT) and near end crosstalk (NEXT) from the disturber in-service subscriber lines into the selected subscriber line during SELT testing.

18. The apparatus of claim 13, wherein the means for cancelling further comprises:
- means for generating on the selected subscriber line a broadband probe signal which signal spans both upstream together with downstream portions of the frequency division multiplexed communication bands on the in-service subscriber lines; and
- means for cancelling both Far End Crosstalk (FEXT) together with Near End Crosstalk (NEXT) disturbance from the broadband probe signal on the subscriber line under test into the victim in-service subscriber lines.

* * * * *

UNITED STATES PATENT AND TRADEMARK OFFICE
CERTIFICATE OF CORRECTION

PATENT NO.        : 8,767,521 B2                                       Page 1 of 1
APPLICATION NO.   : 12/807524
DATED             : July 1, 2014
INVENTOR(S)       : Singh et al.

It is certified that error appears in the above-identified patent and that said Letters Patent is hereby corrected as shown below:

On the Title Page:

On Page 2, in item (56), under "OTHER PUBLICATIONS", in Column 1, Line 14, delete ""Caoperative" and insert -- "Cooperative --, therefor.

In the Drawings:

In Fig. 7, Sheet 7 of 7, for Tag "740", in Line 2, delete "coeffients" and insert -- coefficients --, therefor.

In the Specification:

In Column 2, Line 17, delete "in-service'" and insert -- 'in-service' --, therefor.

In Column 7, Line 7, delete "and or" and insert -- and/or --, therefor.

In Column 8, Line 28, delete "under test." and insert -- under test 158. --, therefor.

Signed and Sealed this
Twenty-third Day of September, 2014

Michelle K. Lee
*Deputy Director of the United States Patent and Trademark Office*